United States Patent
Teragawa (10) Patent No.: US 10,168,469 B2
(45) Date of Patent: Jan. 1, 2019

(54) LIGHT SOURCE DEVICE AND DISPLAY APPARATUS

(71) Applicant: Sakai Display Products Corporation, Sakai-shi, Osaka (JP)

(72) Inventor: Daisuke Teragawa, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 109 days.

(21) Appl. No.: 15/128,079

(22) PCT Filed: Jun. 23, 2014

(86) PCT No.: PCT/JP2014/066569
§ 371 (c)(1),
(2) Date: Sep. 21, 2016

(87) PCT Pub. No.: WO2015/198378
PCT Pub. Date: Dec. 30, 2015

(65) Prior Publication Data
US 2017/0090111 A1    Mar. 30, 2017

(51) Int. Cl.
*G02F 1/1335* (2006.01)
*F21V 8/00* (2006.01)

(52) U.S. Cl.
CPC ......... *G02B 6/0088* (2013.01); *G02B 6/0023* (2013.01); *G02B 6/0031* (2013.01); *G02B 6/0043* (2013.01); *G02B 6/0055* (2013.01); *G02B 6/0085* (2013.01)

(58) Field of Classification Search
CPC .. G02B 6/0088; G02B 6/0055; G02B 6/0085; G02B 6/0023; G02B 6/0031; G02B 6/0043

USPC .......................................................... 349/65
See application file for complete search history.

(56) References Cited

U.S. PATENT DOCUMENTS

2012/0287355 A1* 11/2012 Oya ..................... G02B 6/0031
                                                                   348/790
2014/0104877 A1*  4/2014 An ...................... G02B 6/0088
                                                                   362/609

FOREIGN PATENT DOCUMENTS

JP          2009-205866 A          9/2009

* cited by examiner

*Primary Examiner* — Charles Chang
(74) *Attorney, Agent, or Firm* — Rudy J. Ng; Bret E. Field; Bozicevic, Field & Francis LLP (57) ABSTRACT

Provided is a light-source device comprising a light guide plate having a rectangular shape, a light source facing a side surface of the light guide plate, a reflective sheet having a rectangular shape facing one broad surface of the light guide plate, and a plate-shaped member provided at a distance from the one broad surface. The light source side edge of the reflective sheet is located inwards of a light source side edge of the light guide plate such that a part of the one broad surface on the light source side is formed as an exposed surface, and light leakage prevention unit filling the space between the exposed surface and the plate-shaped member is provided with a protruding portion protruding towards the light source. A reflective body is provided at a position corresponding to a clearance provided between the edge of the reflective sheet and the light-leakage prevention unit.

17 Claims, 8 Drawing Sheets

LIGHT SOURCE DEVICE AND DISPLAY APPARATUS

This application is the national phase under 35 U.S.C. § 371 of PCT International Application No. PCT/JP2014/066569 which has an International filing date of Jun. 23, 2014 and designated the United States of America.

BACKGROUND OF THE INVENTION

1. Field of the Invention

The present invention relates to a display apparatus employing a liquid crystal panel, and to a light source device capable of maintaining high display quality and a display apparatus including the light source device.

2. Description of Related Art

In the recent display apparatuses employing a liquid crystal panel, edge light type light source devices are commonly used for thinning the display apparatus. The edge light type light source device is configured such that a light source such as a light emitting diode and the like is arranged to oppose a side surface of a light guide plate, and light progressing from the side surface into the light guide plate is uniformly emitted from one broad surface of the light guide plate. In such a light source device, a reflection sheet for totally reflecting the light reaching the other broad surface of the light guide plate is further provided on the other broad surface.

Meanwhile, it is suggested that in a display apparatus with a liquid crystal panel, an end part of the reflection sheet in the light source device protrudes longer than the side surface of a light guide plate. In the suggested display apparatus disclosed, an end part of the reflection sheet protruding longer than the side surface of the light guide plate is supported by a support. The protruding end part, thus, functions as a reflector for a light source, so that light from the light source makes efficiency incidence into the light guide plate via the side surface.

SUMMARY OF THE INVENTION

A reflection sheet in the display apparatus with the edge light type light source device extends in a direction along the surface thereof due to a thermal expansion caused by heat from the light source. The extension of the reflection sheet due to the thermal expansion causes the reflection sheet to wrinkle or bend, which may cause deterioration in the display quality of the display apparatus such as uneven luminance or insufficiency of luminance on the display surface.

Thereupon, in the edge light type light source device, a reflection sheet is often configured to be secured to the light guide plate, for example, only at the edge part away from the light source. In the case that the reflection sheet is configured to be supported by a support at a light-source-side end part, the reflection sheet is restricted in extension by the support, and is thus highly likely to wrinkle or bend.

In the light source device in which a reflection sheet is secured and held only at a part, the end part proximal to the light-source of the reflection sheet is subject to more heat from the light source. This may cause curling of the reflection sheet at its end part and an unwanted clearance between the reflection sheet and the light guide plate. Furthermore, in this case, if the end part light source of the reflection sheet is protruded longer than the side surface of the light guide plate, the protruding portion is made closer to the light source and expands due to more heat, which may raise the possibility of the end part of the reflection sheet touching the light source. In the case that the end part of the reflection sheet touches the light source and deviates to be escaped from the light source, a clearance appears between the reflection sheet and the light guide plate, which may cause in the deterioration of reflection efficiency of the reflection sheet. Moreover, in the case that the end part of the reflection sheet touches the light source and covers a part of the light source, a light leakage occurs. The deterioration of the reflection efficiency and the occurrence of the light leakage may cause degradation in the display quality such as uneven luminance or luminance degradation.

The present invention is made in view of the above-described problems, and an object is to provide a light source device capable of eliminating the possibility of a reflection sheet provided to a light guide plate in an edge light type light source device touching a light source, while improving the incidence efficiency of light from the light source into the light guide plate and maintaining high display quality, and a display apparatus with the light source device.

A light source device according to one embodiment of the present invention, comprises: a light guide plate having a rectangular shape; a light source arranged to face a side surface of the light guide plate; a reflection sheet having a rectangular shape facing one broad surface of the light guide plate; and a plate-shaped member provided at a distance from the one broad surface of the light guide plate to form a room for housing the reflection sheet, wherein an edge of the reflection sheet proximal to light source is located inwards of an edge of the light guide plate proximal to light source, a light leakage prevention unit is provided for filling a space between an exposed surface not covered by the reflection sheet on the light source side of the light guide plate and the plate-shaped member, and comprises a protruding portion protruding toward the light source beyond the side surface of the light guide plate, and be thinner than other portions, a clearance is provided between the light leakage prevention unit and the reflection sheet, and a reflective body is provided on a surface of the plate-shaped member facing the exposed surface at a position corresponding to the clearance.

In the light source device according to one embodiment of the present invention, the light leakage prevention unit includes a base body provided with a reflection member on the exposed surface side and a buffer member on the plate-shaped member side.

In the light source device according to one embodiment of the present invention, the light leakage prevention unit includes a base body provided with a light shielding member on a surface in contact with the exposed surface of the light guide plate and a buffer member on the plate-shaped member side.

In the light source device according to one embodiment of the present invention, the light leakage prevention unit further includes a reflection member provided on a light-source-side surface of the protruding portion.

In the light source device according to one embodiment of the present invention, the base body is configured to be integrated with the reflective body.

In the light source device according to one embodiment of the present invention, the thickness of the protruding portion of the light leakage prevention unit tapers down toward the light source side.

In the light source device according to one embodiment of the present invention, the light leakage prevention unit has a stepped surface on the light guide plate side.

In the light source device according to one embodiment of the present invention, the plate-shaped member is a heat dissipation plate formed in an L-shaped angle and is arranged to closely contact a surface opposite to a surface on which the light source is mounted.

The light source device according to one embodiment of the present invention, may further comprises: a frame body provided at a distance from an opposite broad surface opposite to the one broad surface of the light guide plate along a peripheral part of the opposite broad surface; and another light leakage prevention unit filling a space between a part of the frame body proximal to the light source and a part of the peripheral part of the light guide plate; wherein said another light leakage prevention unit comprises a protruding portion to protrude toward the light source beyond the side surface of the light guide plate, and being thinner than other portions.

In the light source device according to one embodiment of the present invention, said another light leakage prevention unit includes a base body provided with a reflection member on the light guide plate side and a buffer member on the frame body side.

In the light source device according to one embodiment of the present invention, said another light leakage prevention unit includes a base body provided with a light shielding member on the light guide plate side and a buffer member on the frame body side.

In the light source device according to one embodiment of the present invention, said another light leakage prevention unit includes a reflection member provided on a light-source-side surface of the protruding portion.

In the light source device according to one embodiment of the present invention, the thickness of the protruding portion of said another light leakage prevention unit tapers down toward the light source side.

In the light source device according to one embodiment of the present invention, said another light leakage prevention unit has a stepped surface on the light guide plate side.

A display apparatus according to one embodiment comprising: a liquid crystal panel; a light guide plate having a rectangular shape arranged in parallel to the liquid crystal panel; a light source arranged to face a side surface of the light guide plate; a reflection sheet having a rectangular shape facing one broad surface side, opposite to the liquid crystal panel side, of the light guide plate; and a plate-shaped member provided at a distance from the one broad surface of the light guide plate to form a room for housing the reflection sheet, wherein an edge of the reflection sheet proximal to light source is located inwards of an edge of the light guide plate proximal to light source, a light leakage prevention unit is provided to fill a space between an exposed surface not covered by the reflection sheet on the light source side of the light guide plate and the plate-shaped member, and comprises a protruding portion to protrude toward the light source beyond the side surface of the light guide plate, and be thinner than other portions, a clearance is provided between the light leakage prevention unit and the reflection sheet, and a reflective body is provided on a surface of the plate-shaped member facing the exposed surface at a position corresponding to the clearance.

According to the embodiment of the present invention, one side of the reflection sheet is located inwards of one long side of the light guide plate, and a part of the one broad surface of the light guide plate is configured to have an exposed surface which is not covered by the reflection sheet. A light leakage prevention unit is provided to fill a space between the exposed surface of the light guide plate and a plate shaped member forming a room housing the reflection sheet. The light leakage prevention unit makes it possible to prevent a light leakage from the light source to the room housing the reflection sheet and makes the reflection sheet less subject to heat from the light source. Provision of the light leakage prevention unit naturally eliminates the possibility of the reflection sheet touching the light source even if the reflection sheet is thermally expanded. It is noted that a part of the light leakage prevention unit protrudes toward the light source beyond the side surface of the light guide plate proximal to the light source, and the protruding portion is configured to be thinner than other portions. This allows a space around the light source to be extended in the direction of thickness of the light guide plate and reduces the possibility of the light source touching the light leakage prevention unit. Furthermore, a clearance formed between the reflection sheet and the light leakage prevention unit reduces the possibility of the reflection sheet touching the light leakage prevention unit if the reflection sheet is thermally expanded. In addition, provision of a reflective body on the plate-shaped member at a position corresponding to the clearance will not unnecessarily reduce the reflection efficiency of the one broad surface of the light guide plate facing the reflection sheet.

According to the embodiment of the present invention, the light leakage prevention unit has a base body functioning as a spacer forming a space between the light guide plate and the plate-shaped member, and is provided with a reflection member on a portion in contact with the exposed surface of the light guide source and a portion facing the light source of the entire surface of the base body. Thus, light emitted from the light source is reflected by the reflection member, and so incidence efficiency on the light guide plate increases. Furthermore, provision of a buffer member to the light leakage prevention unit on the plate-shaped member side allows the light leakage prevention unit and the reflection member to more precisely follow the light guide plate.

According to the embodiment of the present invention, the light leakage prevention unit has a base body functioning as a spacer forming a space between the light guide plate and the plate-shaped member, and is provided with a light shielding member on a portion in contact with the exposed surface of the light guide source of the entire surface of the base body. This allows the light leaking out from the exposed surface of the light guide plate to be absorbed by the light shielding member, thereby avoiding an unnecessary increase in the amount of light at the light guide plate near the light source.

According the embodiment of to the present invention, even if the light leakage prevention unit is provided with the light shielding member at a part thereof that contacts the light guide plate, it is provided with a reflection member on the light-source-side surface of the protruding portion. Thus, light emitted from the light source is reflected by the reflection member, and so incidence efficiency on the light guide plate increases.

According to the embodiment of the present invention, a reflective body provided at a position corresponding to the clearance between the reflection sheet and the light leakage prevention unit is configured to be formed integrally with a base body functioning as a spacer of the light leakage prevention unit. This makes it possible to reduce the number of components.

According to the embodiment of the present invention, the protruding portion of the light leakage prevention unit is tapered toward the light source. Thus, light emitted from the light source is reflected by the reflection member, and so incidence efficiency on the light guide plate increases.

According to the embodiment of the present invention, the light leakage prevention unit has a stepped surface on the light guide plate side, which reduces the thickness of the protruding portion toward the light source side. This makes it possible to simplify the configuration of the light leakage prevention unit.

According to the embodiment of the present invention, the plate-shaped member that sandwiches the light leakage prevention unit between them together with the light guide plate may be an angle-shaped heat dissipation plate that closely contacts a substrate on which the light source is mounted. Providing the light leakage prevention unit on the plate-shaped member for another use eliminates the need for separately providing a specific member.

According to the embodiment of the present invention, by utilizing a frame body that abuts on a peripheral part of the light guide plate on an opposite broad surface opposite to the one broad surface of the light guide plate, another leakage prevention unit is provided between the frame body and the light guide plate. This makes it possible to prevent light from the light source from leaking into a space in contact with the opposite broad surface, and also to increase incidence efficiency on the light guide plate.

According to the embodiment of the present invention, said another light leakage prevention unit is provided with reflection members on a surface in contact with the light guide plate and on the light-source-side surface of the protruding portion. This makes it possible to increase the possibility of light from the light source being reflected by the reflection member and progressing into the light guide plate. Thus, light emitted from the light source is reflected by the reflection member, and so incidence efficiency on the light guide plate increases.

According to the embodiment of the present invention, said another light leakage prevention unit is provided with a light shielding member at a part in contact with the light guide plate. This allows light at an edge part of the light guide plate on the opposite broad surface to be absorbed by the light shielding member, and makes it possible to avoid an unnecessary increase in the amount of light at the light guide plate near the light source.

According to the embodiment of the present invention, even if said another light leakage prevention unit is provided with the light shielding member at a part in contact with the light guide plate, it is also provided with a reflection member on the light-source-side surface of the protruding portion. Thus, light emitted from the light source is reflected by the reflection member, and so incidence efficiency on the light guide plate increases.

According to the embodiment of the present invention, the protruding portion of said another light leakage prevention unit is tapered toward the light source. Thus, light emitted from the light source is reflected by the reflection member, and so incidence efficiency on the light guide plate increases.

According to the embodiment of the present invention, said another light leakage prevention unit has a stepped surface on the light guide plate side, which reduces the thickness of the protruding portion toward the light source side. This makes it possible to simplify the configuration of said another light leakage prevention unit.

Advantageous Effects

According to the embodiment of the present invention, the possibility of the reflection sheet touching the light source can be eliminated, and it is possible to maintain high reflection efficiency at the one broad surface of the light guide plate. Enough space is provided around the light source to thereby have a tolerance for position both of the light source and the light guide plate. In addition, by providing the reflection member in the space, it is possible to improve incidence efficiency from the light source to the light guide plate, and maintain high display quality of the display apparatus with the light source device.

MODES FOR CARRYING OUT THE INVENTION

Hereinafter, the present invention will be described in detail with reference to the accompanying drawings illustrating embodiments thereof, which however shall not be construed as limiting the scope of the invention thereto because the following Embodiments are mere examples.

(Embodiment 1)

Figure 1:
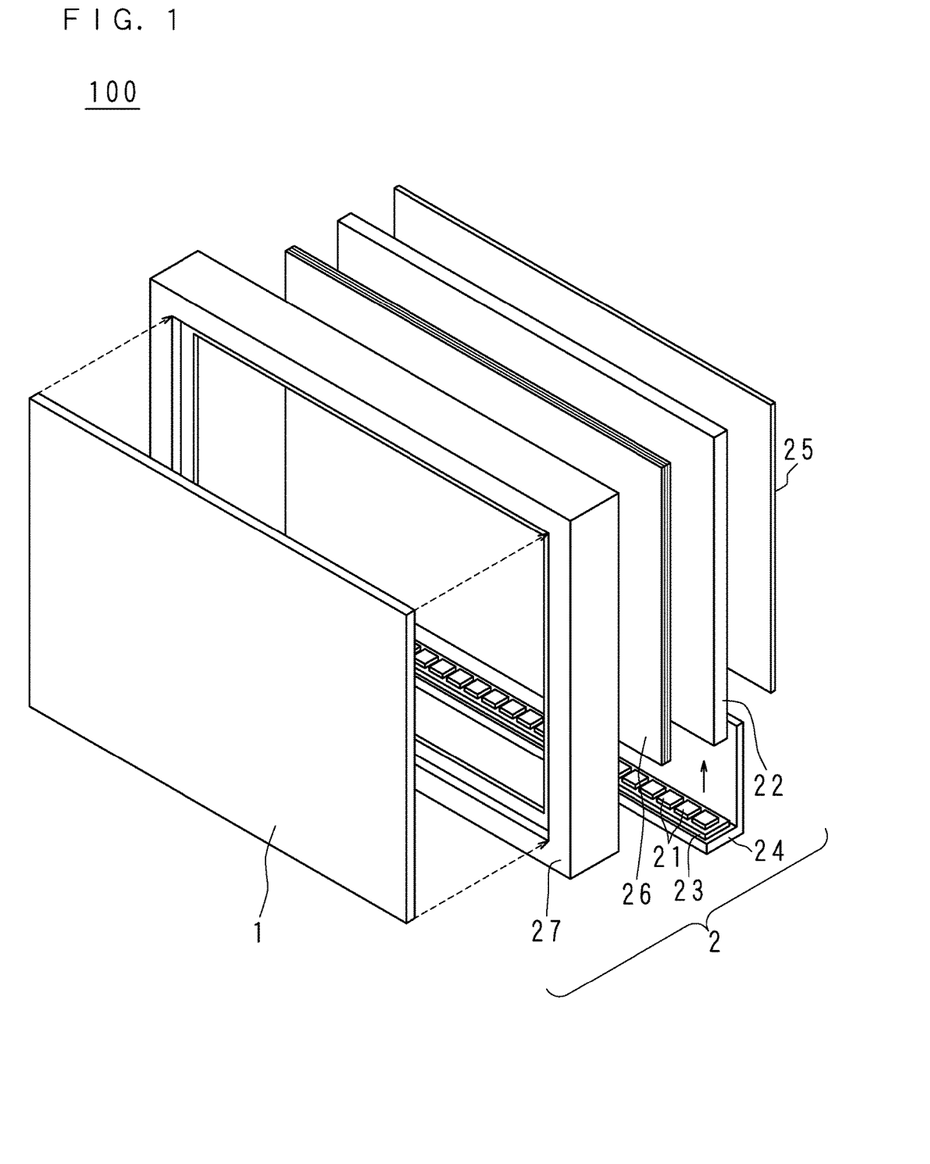
FIG. 1 is an exploded perspective view schematically illustrating main components included in a display apparatus according to Embodiment 1.

FIG. 1 is an exploded perspective view schematically illustrating main components included in a display apparatus 100 according to Embodiment 1. The display apparatus 100 comprises a liquid crystal panel 1 and a light source device 2.

The liquid crystal panel 1 is a display panel, and is formed in a rectangular plate shape. The liquid crystal panel 1 employs an active matrix type. The liquid crystal panel 1 is configured by sealing liquid crystal between two transparent substrates arranged to face each other with a prescribed distance between them.

The light source device 2 is an edge light type device utilizing a light emitting diode 21 as a light source, and comprises the light emitting diode 21, a light guide plate 22, a substrate 23, a heat dissipation plate 24, a reflection sheet 25, an optical sheet 26 and a chassis 27.

The light emitting diode 21 is a light emitting element that emits white light, which is achieved by applying a phosphor to the surface of a diode that emits blue light or ultraviolet light.

The light guide plate 22 is a rectangular transparent plate made of acrylic resin. It is noted that one broad surface of the light guide plate 22 is provided with scattering dots formed by printing or laser beam machining. The thickness of the light guide plate 22 is substantially equal to the width of the light emitting diode 21.

The substrate 23 is formed in strip shape. The length of the substrate 23 is substantially equal to the length of a long side direction of the light guide plate 22, and the width of the substrate 23 is a little greater than the thickness of the light guide plate 22. On one surface of the substrate 23, a plurality of light emitting diodes 21 are mounted so as to be arranged at substantially equal intervals, and a circuit for controlling turning on/off of these light emitting diodes 21 is also formed.

The heat dissipation plate 24 is made of metal having excellent thermal conductivity such as aluminum and is an unequal angle material having an L-shaped cross section.

The reflection sheet 25 is a laminated sheet of a PET film as a base material and a metal film or the like as a reflective layer. The length of a short side direction of the reflection sheet 25 is a little shorter than the length of a short side direction of the light guide plate 22.

The optical sheet 26 is a set of rectangular sheets including a PET film as a base material, and is a set of three optical sheets comprising a lens sheet, a prism sheet and a diffusion sheet, for example. The optical sheet 26 is a little smaller than the broad surface of the light guide plate 22.

The chassis 27 is a frame body including a rectangular frame and a peripheral plate that is vertically raised from the outer edge of the rectangular frame, and has an L-shaped cross section considering the rectangular frame as a vertical line and the peripheral plate as a horizontal line. The opening of the rectangular frame is a little smaller than the optical sheet 26.

The light source device 2 is configured as described below. The substrate 23 is tightly secured to an inner narrow surface of the angle of the heat dissipation plate 24 along the long side direction thereof such that the surface mounted with the light emitting diodes 21 faces a side surface of the light guide plate 22. The heat dissipation plate 24 is arranged such that the inner broad surface of the angle faces one broad surface of the light guide plate 22 to be substantially parallel to each other, and the inner narrow surface of the angle is arranged along the side surface of the light guide plate 22. Here, the reflection sheet 25 is arranged to be substantially parallel to the one broad surface of the light guide plate 22 between the opposing planes of the one broad surface of the light guide plate 22 and the heat dissipation plate 24. The reflection sheet 25 has a plurality of holes at an edge part away from the light source, for example. The plurality of holes are engaged with and held by a plurality of positioning pins that are formed to protrude from the one broad surface of the light guide plate 22 at an edge part away from the light source, for example. Thus, the reflection sheet 25 has a free end at the light source side. The distance between the facing planes of the light guide plate 22 and the heat dissipation plate 24 is a little greater than the thickness of the reflection sheet 25. The optical sheet 26 faces an opposite broad surface opposite to the one broad surface of the light guide plate 22, and the chassis 27 is further arranged over the optical sheet 26. The chassis 27 is provided such that the rectangular frame encloses the peripheral part of the optical sheet 26 and the peripheral part of the light guide plate 22 facing the opposite broad surface. Here, the light guide plate 22, the light emitting diode 21, the substrate 23, the heat dissipation plate 24, the reflection sheet 25 and the optical sheet 26 are housed in the peripheral plate of the chassis 27.

The display apparatus 100 is configured such that the liquid crystal panel 1 is installed in a recess provided at the periphery of the opening of the rectangular frame of the chassis 27. In the display apparatus 100, light from the light emitting diodes 21 is made incident from a long-side surface of the light guide plate 22, is repeatedly subject to total reflection or partial reflection by respective surfaces, or is subject to total reflection by the reflection sheet 25 to proceed into the interior thereof. The light is then scattered by the scattering dots provided on the one broad surface of the light guide plate 22 facing the reflection sheet 25 and emitted from the opposite broad surface of the light guide plate 22 facing the optical sheet 26. The light emitted from the light guide plate 22 passes through the optical sheet 26, and then directed to the liquid crystal panel 1 installed in the recess of the rectangular frame of the chassis 27.

Figure 2:
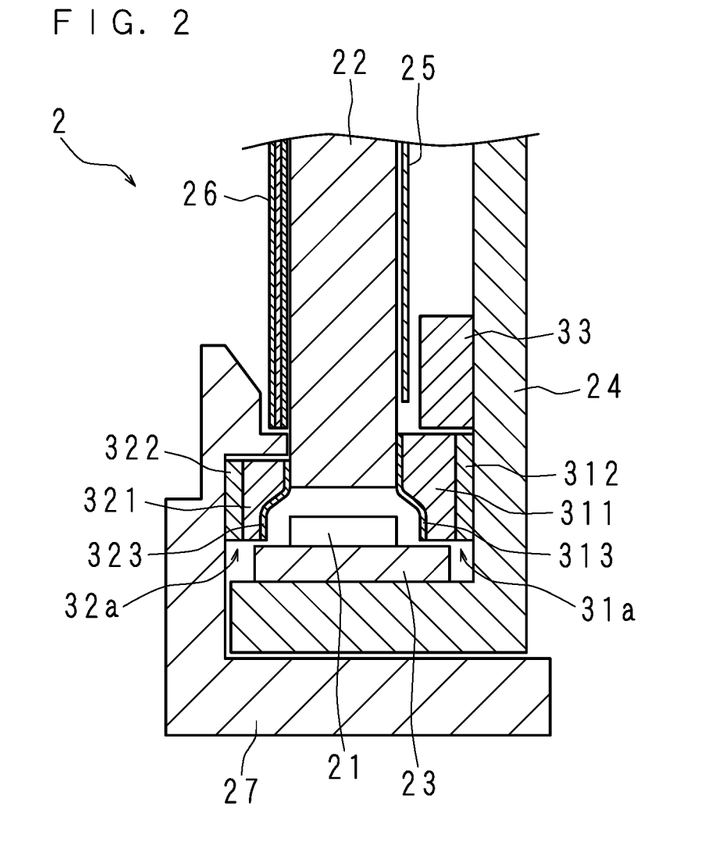
FIG. 2 is a section view schematically illustrating the light source device according to Embodiment 1.

The configuration of the light source device 2 will be described in detail. FIG. 2 is a section view schematically illustrating the light source device 2 according to Embodiment 1. FIG. 2 schematically illustrates an enlarged section of an end of the light source device 2 proximal to the light emitting diode 21.

As described above, the length of a short side direction of the reflection sheet 25 in the light source device 2 is shorter than the length of a short side direction of the light guide plate 22, and one long side of the reflection sheet 25 proximal to the light source is positioned to be displaced more inside than one long side of the light guide plate 22 proximal to the light source. As shown in FIG. 2, this creates an exposed surface that is not covered with the reflection sheet 25 at a part of the one broad surface of the light guide plate 22 proximal to the light source. It is noted that the range of the exposed surface is in line with the rectangular frame of the chassis 27 so as to be located outside the pixel areas of the liquid crystal panel 1.

The exposed surface of the light guide plate 22 and the heat dissipation plate 24 face each other to provide a space a little greater than the thickness of the reflection sheet 25. A first light leakage prevention unit 31a filling the space is provided between the opposing planes.

As shown in FIG. 2, the first light leakage prevention unit 31a comprises a base body 311 tapering down its thickness toward the light source in cross section, a buffer member 312 adhered to a plane surface side of the base body 311, and a reflector (reflection member) 313 adhered to a tapered surface side of the base body 311. The first light leakage prevention unit 31a is adhered and secured to the heat dissipation plate 24 on its buffer member 312 side, and is provided to extend throughout the whole length in the long side direction of the heat dissipation plate 24. It is noted that the base body 311 employs opaque resin or the like, and the buffer member 312 employs foamed resin or the like. The reflector 313 is a film-typed reflection member configured to form a highly reflective film such as a white film, a metallic thin film or the like on the light source side.

The thickness of a thick portion of the first light leakage prevention unit 31a is substantially equal to or a little greater than a distance between the exposed surface of the light guide plate 22 and the heat dissipation plate 24. Thus, the first light leakage prevention unit 31a is sandwiched between the exposed surface of the light guide plate 22 and the heat dissipation plate 24, and totally covers the space between the exposed surface of the light guide plate 22 and the heat dissipation plate 24. A thin portion of the first light leakage prevention unit 31a protrudes toward the light source.

A predetermined clearance is provided between the first light leakage prevention unit 31a and the edge of the reflection sheet 25. A spacer 33 for filling the space between the end part of the reflection sheet 25 and the heat dissipation plate 24 is provided at the position corresponding to the clearance. The spacer 33 is a reflective body made of resin having high reflectively, for example, white silicon. The spacer 33 has rectangular cross section, and extends along the first light leakage prevention unit 31*a* on the dissipation plate 24. It is noted that the height of the spacer 33 is a little shorter than the length obtained by subtracting the thickness of the reflection sheet 25 from the distance between the light guide plate 22 and the heat dissipation plate 24.

Meanwhile, an inner surface of the rectangular frame of the chassis 27 and an edge part of one broad surface, facing the optical sheet 26, of the light guide plate 22 face each other to provide a space a little greater than the thickness of the optical sheet 26. A second light leakage prevention unit 32*a* filling the space is provided between the facing planes.

As shown in FIG. 2, the second light leakage prevention unit 32*a* comprises a base body 321 tapering down its thickness toward the light source in cross section, a buffer member 322 adhered to a plane surface side of the base body 321, and a reflector 323 adhered to a tapered surface side of the base body 321. The second light leakage prevention unit 32*a* is adhered and secured to the rectangular frame of the chassis 27 on its buffer member 322 side, and is formed to extend throughout the whole length in the long side direction of the rectangular frame. It is noted that base body 321 employs opaque resin or the like, and the buffer member 322 employs foamed resin or the like. The reflector 323 is a film-typed reflection member configured to form a highly reflective film such as a white film, a metallic thin film or the like on the light source side.

The thickness of a thick portion of the second light leakage prevention unit 32*a* is substantially equal to or a little greater than a distance between the light guide plate 22 and the rectangular frame of the chassis 27. Thus, the second light leakage prevention unit 32*a* is sandwiched between the light guide plate 22 and the rectangular frame of the chassis 27, and totally covers the space between the light guide plate 22 and the rectangular frame. A thin portion of the second light leakage prevention unit 32*a* protrudes toward the light source.

In the light source device 2 configured as described above, one long side of the reflection sheet 25 proximal to the light source is displaced more inside than one long side of the light guide plate 22 proximal to the light source. In addition, there is closely blocked up by the first light leakage prevention unit 31 between the reflection sheet 25 and the light source. Accordingly, the reflection sheet 25 is less subject to heat from the light source, and is less subject to curling at its edge. Also, provision of the clearance between the edge of the reflection sheet 25 and the first light leakage prevention unit 31*a* reduces the possibility of the end of the reflection sheet 25 touching the first light leakage prevention unit 31*a* in the case that the reflection sheet 25 is thermally expanded, which further eliminates the possibility of the reflection sheet 25 touching the light source. Provision of the spacer 33 near the edge of the reflection sheet 25 prevents the edge of the reflection sheet 25, which is a free end and can be thermally expanded, from fluttering in the direction of the thickness. Furthermore, the reflectivity of the spacer 33 allows the light leaking from the light guide plate 22 through the clearance between the reflection sheet 25 and the first light leakage prevention unit 31*a* to return to the light guide plate 22. This makes it possible to maintain the high reflection efficiency of the light guide plate 22 facing the reflection sheet 25.

Also, in the light source device 2, light emitted from the light source diverges radially, and some light beams are deviated from the side surface of the light guide plate 22. The light beams deviated from the side surface of the light guide plate 22 are caught and reflected by the reflector 313 of the first light leakage prevention unit 31*a* or the reflector 323 of the second light leakage prevention unit 32*a*, and are thus highly likely to proceed into the side surface of the light guide plate 22. This makes it possible to improve incidence efficiency from the light source to the light guide plate 22.

Furthermore, in the case that the light beams entering the light guide plate 22 via the side surface reaches the light-source-side end part of the broad surface of the light guide plate 22 facing the reflection sheet 25, even if the light partially leaks outside, the light can be reflected by the reflector 313. This makes it possible to reduce the loss of light near the light source. In addition, although there is a predetermined clearance between the edge of the reflection sheet 25 and the first light leakage prevention unit 31*a*, since the spacer 33 having high reflectivity is provided at the position corresponding to the clearance, light leaking from the part of the exposed surface of the light guide plate 22 that corresponds to the clearance to the heat dissipation plate 24 is likely to be reflected by the spacer 33 and returned to the light guide plate 22. Therefore, it is possible to reduce the loss of light.

In the light source device 2, the substrate 23 on which the light emitting diodes 21 are mounted is arranged to oppose the side surface of the light guide plate 22. However, because of the variation in dimension of the respective members and warpage of the respective members due to the age deterioration, the substrate 23 and the light guide plate 22 may be subject to a displacement in the direction of the thickness of the light guide plate 22. In the light source device 2, the first light leakage prevention unit 31*a* totally covers the space between the exposed surface of the light guide plate 22 and the heat dissipation plate 24, and the second light leakage prevention unit 32*a* totally covers the space between the light guide plate 22 and the rectangular frame of the chassis 27. Furthermore, the first light leakage prevention unit 31*a* and the second light leakage prevention unit 32*a* each have a concave curved surface with respect to the light source of the light emitting diode 21. Accordingly, even if the substrate 23 is displaced in the direction of the thickness of the light guide plate 22 with respect to the side surface of the light guide plate 22, it is possible to prevent light from the light source from leaking into a room around the reflection sheet 25 or a room around the optical sheet 26 and it is also possible to maintain the incidence efficiency to the side surface of the light guide plate 22.

Furthermore, the thin configuration of the protruding portions of the first light leakage prevention unit 31*a* and the second light leakage prevention unit 32*a* each protruding toward the light source provides more space near the light emitting diode 21 in the direction of the thickness of the light guide plate 22 and enough space for a tolerance for position both of the light emitting diode 21 and the light guide plate 22.

Figure 8:
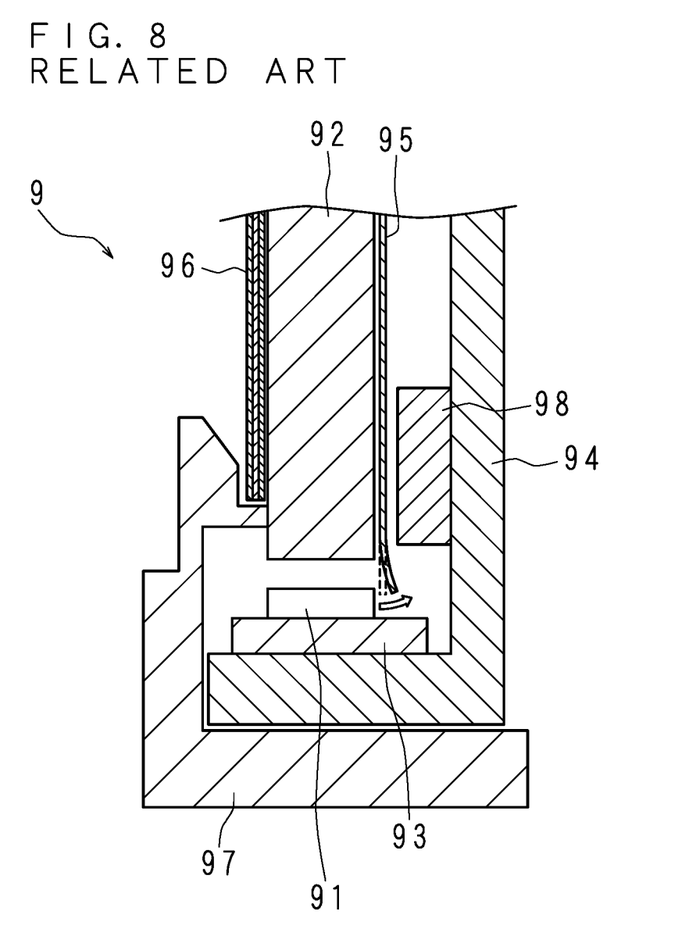
FIG. 8 is a section view schematically illustrating a light source device according to Comparative Example.

The light source device 2 configured as described above will be described in comparison with another example. In this comparative example, the light-source-side end of the reflection sheet is configured to extend longer than the side surface of the light guide plate. FIG. 8 is a section view schematically illustrating a light source device 9 according to Comparative Example. FIG. 8 schematically illustrates an enlarged section of the end of the light source device 9 proximal to the light source. The light source device 9 according to Comparative Example is an edge light type device utilizing a light emitting diode 91 as a light source, and comprises the light emitting diode 91, a light guide plate 92, a substrate 93, a heat dissipation plate 94, a reflection sheet 95, an optical sheet 96 and a chassis 97. Respective components are similar to those of the light source device 2 presented in Embodiment 1 other than the reflection sheet 95, and thus will not be described in detail.

In the light source device 9 according to Comparative Example, the end part of the reflection sheet 95 extends longer than the side surface of the light guide plate 92 proximal to the light source. The edge part of the reflection sheet 95 opposite to the light source is engaged by positioning pins that protrude from the edge part of the light guide plate 92 away from the light source, for example. Thus, the end part of the reflection sheet 95 proximal to the light source is a free end. In order to prevent the end part from fluttering, a spacer 98 for filling a space between the light guide plate 92 and the heat dissipation plate 94 is provided. In the light source device 9, the extension of the reflection sheet 95 allows light beams deviated from the side surface of the light guide plate 92 out of the light emitted from the light source to be reflected toward the side surface of the light guide plate 92.

In the light source device 9 according to Comparative Example, although the spacer 98 is provided, the spacer 98 does not support the reflection sheet 95, and therefore, it is impossible to prevent the end part of the reflection sheet 95 from curling due to the heat from the light source. Accordingly, there is a high possibility of an unnecessary clearance appears between the reflection sheet 95 and the light guide plate 92. If the unnecessary clearance appears, there occurs uneven dispersion of light emitted from the optical sheet 96 side of the light source device 9. In contrast, in the light source device 2 according to Embodiment 1, the reflection sheet 25 is less subject to heat from the light source, and is far less subject to curling at its edge part in a direction away from the broad surface of the light guide plate 22. This reduces the possibility of the clearance being formed between the reflection sheet 25 and the light guide plate 22. According to Embodiment 1, there is no possibility of the reflection sheet 25 touching the light source. Additionally, in the light source device 2 according to Embodiment 1, the reflectors 313, 323 are located near the light source owing to the first and the second light leakage prevention units 31a, 32a. These can perform the function of reflecting the light beams deviated from the side surface of the light guide plate 22 toward the side surface as in the end part of the reflection sheet 95 in the light source device 9 according to Comparative Example.

In order to avoid curling of the end part of the reflection sheet 95 due to heat from the light source, it is also conceivable that the edge of the reflection sheet 95 of the light source device 9 according to Comparative Example is configured to be displaced more inside than the side surface of the light guide plate 92 (not shown). However, with only such a configuration, the edge of the reflection sheet 95 is more likely to curl due to the heat from the light emitting diode 91, to thereby form an unnecessary clearance between the reflection sheet 95 and the light guide plate 92. This causes uneven dispersion of the light emitted from the optical sheet 96 side of the light source device 9. In contrast, in the light source device 2 according to Embodiment 1, the first light leakage prevention unit 31a provided between the reflection sheet 25 and the light source minimizes the possibility of the edge of the reflection sheet 25 curling due to heat from the light source, and prevents an unnecessary clearance between the reflection sheet 25 and the light guide plate 22 from being formed.

In the light source device 2 according to Embodiment 1 as described above, it is possible to maintain high reflection efficiency on one broad surface of the light guide plate 22, to improve the incidence efficiency from the light source to the light guide plate 22, and to keep the evenness of the light emitted from the optical-sheet 26 side surface of the light guide plate 22. Thus, in the display apparatus 100 employing the light source device 2, it is possible to maintain high display quality by reducing a shortage of light or occurrence of uneven luminance on the display surface of the liquid crystal panel 1. Furthermore, as described above, the thin configuration of the protruding portions of the first light leakage prevention unit 31a and the second light leakage prevention unit 32a each protruding toward the light source provides enough space for a tolerance for position of the substrate 23 mounted with the light emitting diode 21 and the light guide plate 22. This makes it possible to reduce variation in the display quality of the display apparatus 100 employing the light source device 2.

Furthermore, as shown in Embodiment 1, a surface of the first light leakage prevention unit 31a proximal to the light guide plate 22, the reflectors 313 are provided at a thin portion that protrudes toward the light source as well as at a portion that contacts the exposed surface of the light guide plate 22. Similarly, the reflector 323 is provided to a portion of the second light leakage prevention unit 32a that contacts the light guide plate 22. A finding shows that if light entering from the side surface of the light guide plate 22 reaches a plane surface except for the scattering dots of both broad surfaces with the reflected angle maintained, the light partially leaks to the light guide plate 22 though the light is supposed to be substantially totally reflected on the plane surface. By sandwiching both light-source-side edge parts of the broad surfaces of the light guide plate 22 between the reflector 313 and the reflector 323, light leaking to the outside near the edge parts can be returned to the interior of the light guide plate 22 again. Thus, it is possible to efficiently reduce the loss of light.

(Embodiment 2)

Figure 3:
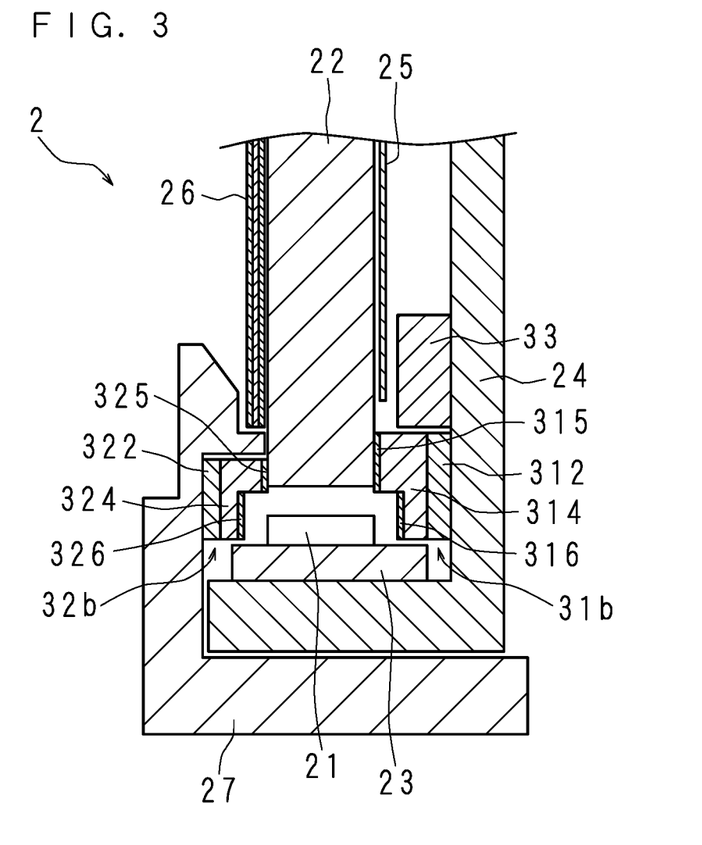
FIG. 3 is a section view schematically illustrating a light source device according to Embodiment 2.

FIG. 3 is a section view schematically illustrating a light source device 2 according to Embodiment 2. A configuration of the light source device 2 according to Embodiment 2 is similar to the configuration according to Embodiment 1 other than the configuration of the light leakage prevention unit. Therefore, the configuration equivalent to Embodiment 1 will be denoted by the same reference numerals, and will not be described in detail.

FIG. 3 schematically illustrates an enlarged section of an end part of the light source device 2 proximal to the light emitting diode 21 according to Embodiment 2. In Embodiment 2, a first light leakage prevention unit 31b filling a space is provided between the facing planes of the exposed surface of the light guide plate 22 and the heat dissipation plate 24.

As shown in FIG. 3, the first light leakage prevention unit 31b according to Embodiment 2 comprises a base body 314 being stepped in cross section on the light guide plate 22 side, a buffer member 312 adhered to a plane surface side of the base body 314, and reflectors 315, 316 adhered to two surfaces of different levels. The first light leakage prevention unit 31b is adhered and secured to the heat dissipation plate 24 on the buffer member 312 side, and is provided to extend throughout the whole length of a long side direction of the heat dissipation plate 24. The base body 314 employs opaque resin or the like. The reflectors 315, 316 are film-typed reflection members configured to form a highly reflective film such as a white film, a metallic thin film or the like on the light source side. The reflector 315 is adhered to the surface of a thick portion, whereas the reflector 316 is adhered to the surface of a thin portion.

The thickness of the thick portion of the first light leakage prevention unit 31b is substantially equal to or a little greater than a distance between the exposed surface of the light guide plate 22 and the heat dissipation plate 24. Thus, the first light leakage prevention unit 31b is sandwiched between the exposed surface of the light guide plate 22 and the heat dissipation plate 24, and totally covers the space between the exposed surface of the light guide plate 22 and the heat dissipation plate 24. The thin portion of the first light leakage prevention unit 31b protrudes toward the light source.

Meanwhile, a second light leakage prevention unit 32b filling a space is provided between the opposing planes of an inner surface of the rectangular frame of the chassis 27 and an optical-sheet-26-side edge of one broad surface of the light guide plate 22.

As shown in FIG. 3, the second light leakage prevention unit 32b comprises a base body 324 being stepped in cross section on the light guide plate 22 side, a buffer member 322 adhered to a plane surface side of the base body 324, and reflectors 325, 326 adhered to two surfaces of different levels. The second light leakage prevention unit 32b is adhered and secured to the rectangular frame of the chassis 27 on its buffer member 322 side, and is provided to extend throughout the whole length in the long side direction of the rectangular frame. The base body 324 employs opaque resin or the like. The reflectors 325, 326 are film-typed reflection members configured to form a highly reflective film such as a white film, a metallic thin film or the like on the light source side. The reflector 325 is adhered to the surface of a thick portion whereas the reflector 326 is adhered to the surface of a thin portion.

The thickness of the thick portion of the second light leakage prevention unit 32b is substantially equal to or a little greater than a distance between the light guide plate 22 and the rectangular frame of the chassis 27. Thus, the second light leakage prevention unit 32b is sandwiched between the light guide plate 22 and the rectangular frame of the chassis 27 and totally covers the space between the light guide plate 22 and the rectangular frame. The thin portion of the second light leakage prevention unit 32b protrudes toward the light source.

In the light source device 2 configured as described above, similarly to Embodiment 1, the reflection sheet 25 is less subject to heat from the light emitting diodes 21, and is less subject to curling at its edge. Even if the reflection sheet 25 is thermally expanded, the edge of the reflection sheet 25 is far less likely to touch the first light leakage prevention unit 31b, which naturally eliminates the possibility of the reflection sheet 25 touching the light emitting diode 21. Accordingly, there is far less possibility of a clearance being formed between the reflection sheet 25 and the light guide plate 22, and it is thus possible to maintain high reflection efficiency by the reflection sheet 25. The other effects of this embodiment are similar to those in Embodiment 1.

According to Embodiment 2, the base body 314 of the first light leakage prevention unit 31b and the base body 324 of the second light leakage prevention unit 32b are formed to be stepped on one surface. This makes it possible to make the configurations of the base body 314 and the base body 324 simpler than those of Embodiment 1.

(Embodiment 3)

Figure 4:
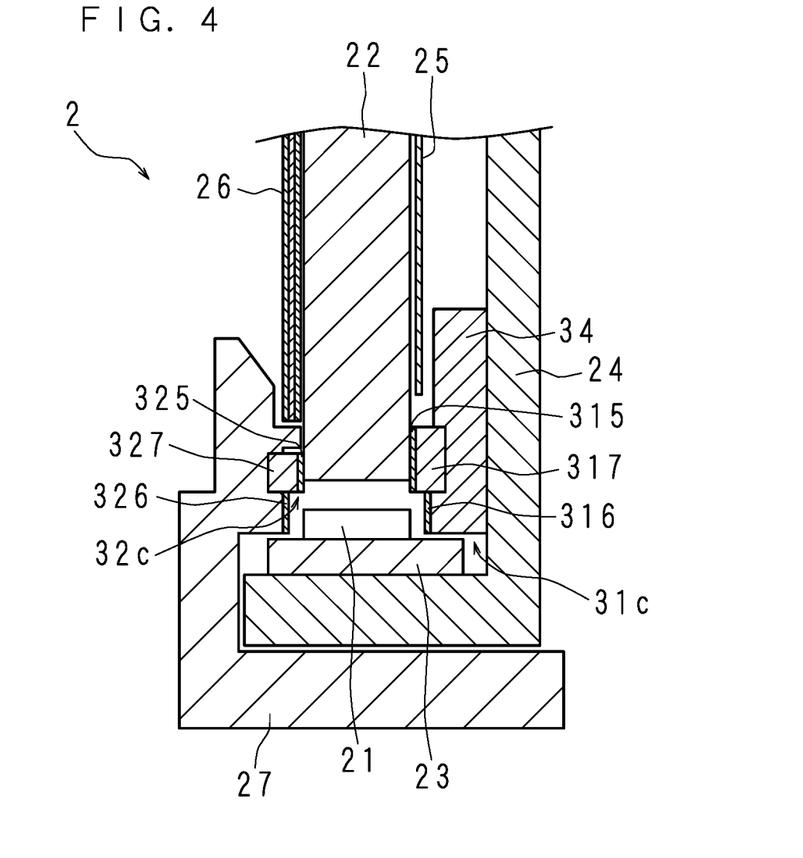
FIG. 4 is a section view schematically illustrating a light source device according to Embodiment 3.

FIG. 4 is a section view schematically illustrating a light source device 2 according to Embodiment 3. A configuration of the light source device 2 according to Embodiment 3 is similar to the configuration according to Embodiment 1 other than the configuration of the light leakage prevention unit and the detailed configuration of the chassis 27. Therefore, the configuration equivalent to Embodiment 1 will be denoted by the same reference numerals, and will not be described in detail.

FIG. 4 schematically illustrates an enlarged section of an end of the light source device 2 proximal to the light emitting diode 21. In Embodiment 3, a first light leakage prevention unit 31c filling in a space is provided between the facing planes of the exposed surface of the light guide plate 22 and the heat dissipation plate 24.

The first light leakage prevention unit 31c according to Embodiment 3 comprises a spacer 34 that is adhered and secured so as to extend along the long side direction of the heat dissipation plate 24 and has a concave groove facing the light guide plate 22, a buffer member 317 that is fitted and adhered to the concave groove, and reflectors 315, 316 respectively adhered to the light-guide-plate-22-side surface of the buffer member 317 and the light-source-side surface of the spacer 34. It is noted that the spacer 34 employs resin or the like having highly reflectivity, and the buffer member 317 employs foamed resin or the like. The reflectors 315, 316 are similar to those presented in Embodiment 2.

The thickness of a thickest portion (where the buffer member 317 is fitted to the concave groove) of the first light leakage prevention unit 31c is substantially equal to or a little greater than a distance between the light guide plate 22 and the heat dissipation plate 24. Thus, the first light leakage prevention unit 31c is sandwiched between the exposed surface of the light guide plate 22 and the heat dissipation plate 24, and totally covers the space between the exposed surface of the light guide plate 22 and the heat dissipation plate 24. The first light leakage prevention unit 31c on its reflector 316 side protrudes toward the light source. It is noted that a predetermined clearance is provided between the buffer member 317 of the first light leakage prevention unit 31c and the edge of the reflection sheet 25, and the thin portion of the first light leakage prevention unit 31c opposite to the light source is in the position corresponding to the predetermined clearance.

Meanwhile, inside the rectangular frame of the chassis 27 according to Embodiment 3, a concave groove is formed in the long side direction thereof. Between the facing planes of a bottom surface of the concave groove and an edge part of one broad surface of the light guide plate 22 facing the optical sheet 26, a second light leakage prevention unit 32c filling a space is provided.

The second light leakage prevention unit 32c comprises a buffer member 327 having rectangular cross section that is fitted and adhered to the concave groove of the rectangular frame, a reflector 325 formed on a surface of the buffer member 327 facing the light guide plate 22, and a reflector 326 adhered to a light-source-side surface on the periphery of the concave groove. The reflectors 325, 326 are similar to those presented in Embodiment 2.

The thickness of a thickest portion (where the buffer member 327 is fitted to the concave groove) of the second light leakage prevention unit 32c is substantially equal to or a little greater than a distance between the opposing planes of the rectangular frame of the chassis 27 and the light guide plate 22. Thus, the second light leakage prevention unit 32c is sandwiched between the light guide plate 22 and the rectangular frame of the chassis 27 and totally covers the space between the light guide plate 22 and the rectangular frame of the chassis 27.

A distance between the reflector 326 of the second light leakage prevention unit 32c and the reflector 316 adhered to the spacer 34 of the first light leakage prevention unit 31c is greater than the thickness of the light guide plate 22. Even if the substrate 23 moves in the direction of the thickness of the light guide plate 22, the light emitting diode 21 is far less likely to touch the reflectors 316, 326.

In the light source device 2 configured as described above, similarly to Embodiment 1, the reflection sheet 25 is less subject to heat from the light emitting diodes 21, and is less subject to curling at its edge. Even if the reflection sheet 25 is thermally expanded, the edge of the reflection sheet 25 is far less likely to touch the first light leakage prevention unit 31*c*, which naturally eliminates the possibility of the edge of the reflection sheet 25 reaching the light emitting diodes 21. Accordingly, there is far less possibility of a clearance being formed between the reflection sheet 25 and the light guide plate 22, and thus, it is possible to maintain high reflection efficiency by the reflection sheet 25. The other effects of this embodiment are also similar to those in Embodiment 1.

According to Embodiment 3, the spacer 34 of the first light leakage prevention unit 31*c* further serves as a spacer (base body) for filling the space between the exposed surface of the light guide plate 22 and the heat dissipation plate 24 and also as a reflective body having high reflectivity at a position corresponding to the clearance between the first light leakage prevention unit 31*c* and the reflection sheet 25. This makes it possible to reduce the number of components. Also, in the second light leakage prevention unit 32*c*, no base body is required to further reduce the number of components.

(Embodiment 4)

Figure 5:
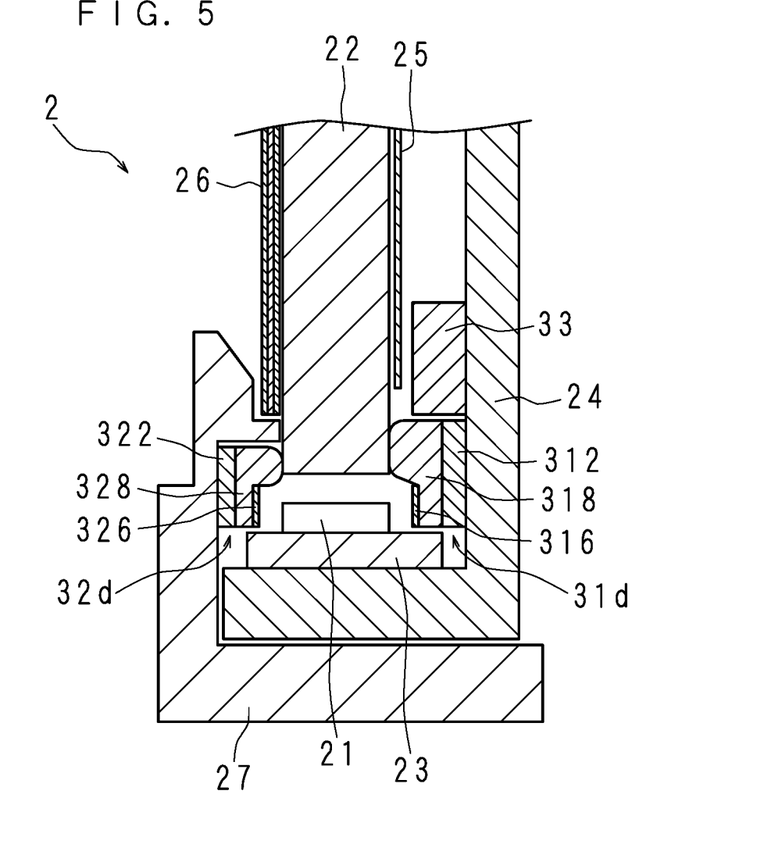
FIG. 5 is a section view schematically illustrating a light source device according to Embodiment 4.

FIG. 5 is a section view schematically illustrating a light source device 2 according to Embodiment 4. A configuration of the light source device 2 according to Embodiment 4 is similar to the configuration according to Embodiment 1 other than the detailed configuration of the light leakage prevention unit. Therefore, the configuration equivalent to Embodiment 1 will be denoted by the same reference numerals, and will not be described in detail.

FIG. 5 schematically illustrates an enlarged section of an end of the light source device 2 proximal to the light emitting diode 21 according to Embodiment 4. In Embodiment 4, the first light leakage prevention unit 31*d* filling a space is provided between the facing planes of the exposed surface of the light guide plate 22 and the heat dissipation plate 24.

As shown in FIG. 5, a first light leakage prevention unit 31*d* according to Embodiment 4 comprises a base body 318 partially protruding in a semicircular shape in cross section from a part of the surface facing the light guide plate 22 at a position away from the light source, a buffer member 312 adhered to a plane surface of the base body 318, and a reflector 316 adhered to a plane surface portion of the base body 318 facing the light guide plate 22 at a position closer to the light source. It is preferable that the base body 318 employs opaque resin materials of black or so having a high light-shielding property. The reflector 316 is similar to that presented in Embodiment 2.

The thickness of a thick portion of the first light leakage prevention unit 31*d* is substantially equal to or a little greater than a distance between the exposed surface of the light guide plate 22 and the heat dissipation plate 24. Thus, the first light leakage prevention unit 31*d* is sandwiched between the exposed surface of the light guide plate 22 and the heat dissipation plate 24 and totally covers the space between the exposed surface of the light guide plate 22 and the heat dissipation plate 24. A thin portion of the first light leakage prevention unit 31*d* protrudes toward the light source.

Meanwhile, a second light leakage prevention unit 32*d* filling a space is provide between the opposing planes of an inner surface of the rectangular frame of the chassis 27 according to Embodiment 4 and an optical-sheet-26*a* side edge of one broad surface of the light guide plate 22.

As shown in FIG. 5, the second light leakage prevention unit 32*d* comprises a base body 328 with a part of its surface protruding in a semicircular shape in cross section at the light guide plate 22 side that is away from the light source, a buffer member 322 adhered to a plane surface of the base body 328, and a reflector 326 adhered to a plane surface portion of the base body 328 facing the light guide plate 22 at a position closer to the light source. It is preferable that the base body 328 employs opaque resin materials of black or so having a high light-shielding property. The reflectors 326 is similar to that presented in Embodiment 2.

The thickness of a thick portion of the second light leakage prevention unit 32*d* is substantially equal to or a little greater than a distance between the opposing planes of the light guide plate 22 and the rectangular frame of the chassis 27. Thus, the second light leakage prevention unit 32*d* is sandwiched between the light guide plate 22 and the rectangular frame of the chassis 27 and totally covers the space between the light guide plate 22 and the rectangular frame of the chassis 27. A thin portion of the second light leakage prevention unit 32*d* protrudes toward the light source.

In the light source device 2 configured as described above, in Embodiment 4 also, the reflection sheet 25 is less subject to heat from the light emitting diodes 21, and is less subject to curling at its edge. Even if the reflection sheet 25 is thermally expanded, the edge of the reflection sheet 25 is far less likely to touch the first light leakage prevention unit 31*d*, which eliminates the possibility of the edge of the reflection sheet 25 touching the light emitting diode 21. Accordingly, there is far less possibility of a clearance being formed between the reflection sheet 25 and the light guide plate 22, and it is thus possible to maintain high reflection efficiency by the reflection sheet 25. The other effects of this embodiment are also similar to those in Embodiment 1.

According to Embodiment 4, the base body 318 of the first light leakage prevention unit 31*d* and the base body 328 of the second light leakage prevention unit 32*d* are made of high light-shielding materials, and the base body 318 as well as the base body 328 contact the end parts of both broad surfaces of the light guide plate 22 proximal to the light source. The light-source-side edges of both of the broad surfaces of the light guide plate 22 are sandwiched not by reflectors but by shielding members, whereby light leaking to the outside near the end parts is absorbed by the shielding members. This makes it possible to avoid excessive amount of light at the light-source-side end parts of the light guide plate 22 and to maintain high display quality in the display apparatus 100 with the light source device 2.

(Embodiment 5)

Figure 6:
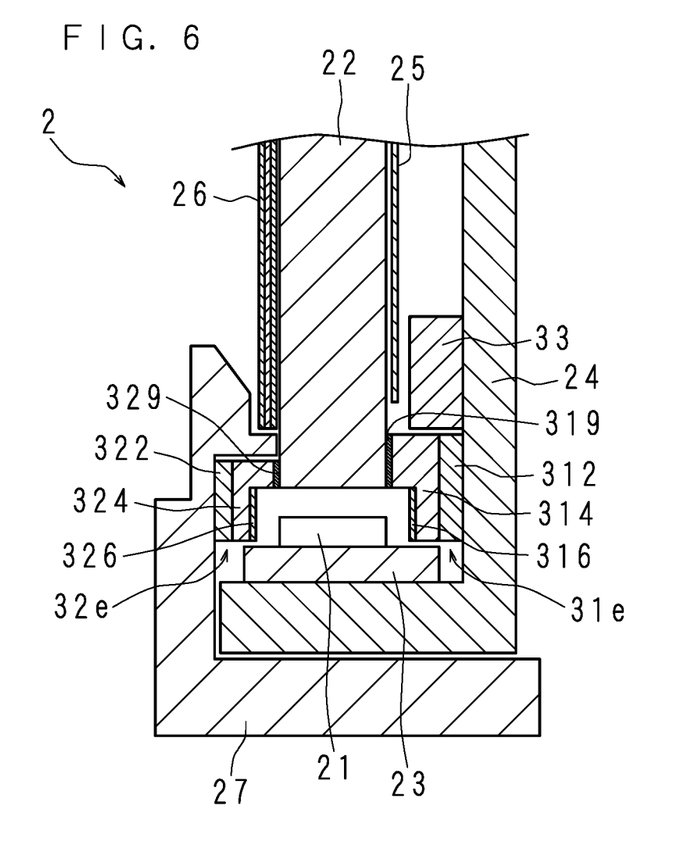
FIG. 6 is a section view schematically illustrating a light source device according to Embodiment 5.

FIG. 6 is a section view schematically illustrating a light source device 2 according to Embodiment 5. A configuration of the light source device 2 according to Embodiment 5 is similar to the configuration according to Embodiment 1 other than the configuration of the light leakage prevention unit. Therefore, the configuration equivalent to Embodiment 1 will be denoted by the same reference numerals, and will not be described in detail.

FIG. 6 schematically illustrates an enlarged section of an end of the light source device 2 proximal to the light emitting diode 21 according to Embodiment 5. In Embodiment 5, a first light leakage prevention unit 31*e* filling a space is provided between the opposing planes of the exposed surface of the light guide plate 22 and the heat dissipation plate 24.

As shown in FIG. 6, the first light leakage prevention unit 31e according to Embodiment 5 comprises a base body 314, a buffer member 312 adhered to a plane surface side of the base body 314, and a light shielding sheet 319 and a reflector 316 that are adhered to two surfaces of different levels of a stepped surface side of the base body 314. The base body 314 and the reflector 316 are similar to those presented in Embodiment 2, and the reflector 316 is adhered to a light-guide-plate-22-side surface of a thin portion of the base body 314. The light shielding sheet 319 employs opaque materials of black or so having a high light-shielding property, and is adhered to a thick portion of the base body 314 facing the light guide plate 22.

Meanwhile, a second light leakage prevention unit 32e filling a space is provide between the facing planes of an inner surface of the rectangular frame of the chassis 27 according to Embodiment 5 and the optical-sheet-26-side edge of the one broad surface of the light guide plate 22.

As shown in FIG. 6, the second light leakage prevention unit 32e comprises a base body 324, a buffer member 322 adhered to a plane surface side of the base body 324, and a light shielding sheet 329 and a reflector 326 that are adhered to two surfaces of different levels of a stepped surface side of the base body 324. The base body 324 and the reflector 326 are similar to those presented in Embodiment 2, and the reflector 326 is adhered to a thin portion of the base body 324 facing the light guide plate 22. The light shielding sheet 329 employs opaque materials of black or so having a high light-shielding property, and is adhered to the surface of the thick portion of the base body 324 which contacts the light guide plate.

That is, the first light leakage prevention unit 31e according to Embodiment 5 is configured by being adhered to the light shielding sheet 319 in place of the reflector 315 of the first light leakage prevention unit 31b according to Embodiment 2. Also, the second light leakage prevention unit 32e is configured by being adhered to the light shielding sheet 329 in place of the reflector 325 of the second light leakage prevention unit 32b according to Embodiment 2. The configuration other than those is similar to that presented in Embodiment 2.

According to Embodiment 5, the configurations of the base body 314 of the first light leakage prevention unit 31e and the base body 324 of the second light leakage prevention unit 32e are made simple with a stepped one surface. In addition, light slightly leaking to the outside from the light-source-side edges of the broad surfaces of the light guide plate 22 out of the light that enters from the side surface of the light guide plate 22 is absorbed by the light shielding sheet 319 and the light shielding sheet 329. This makes it possible to avoid excessive amount of light at the light-source-side edges of the light guide plate 22 and to maintain high display quality in the display apparatus 100 with the light source device 2.

(Embodiment 6)

Figure 7:
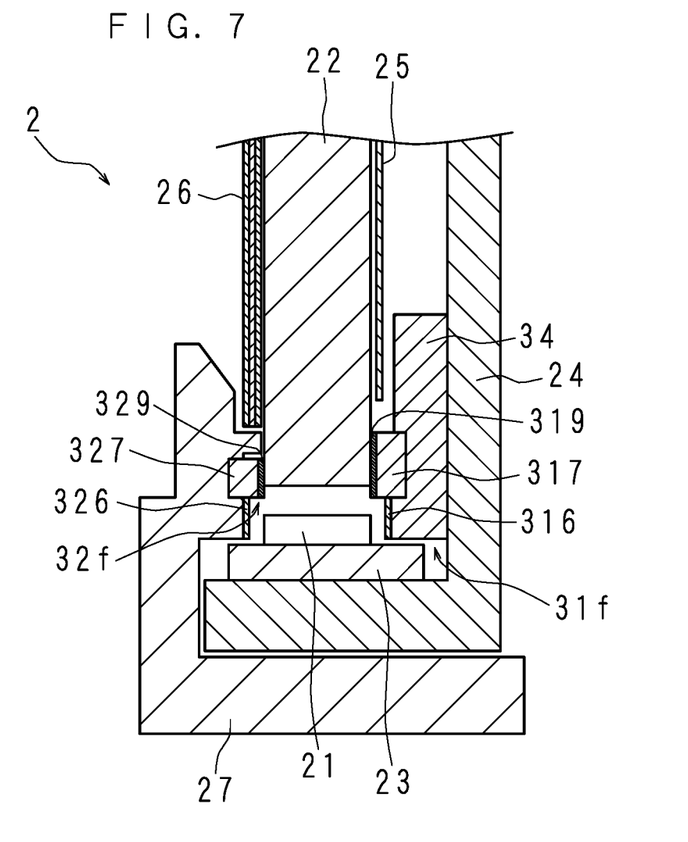
FIG. 7 is a section view schematically illustrating a light source device according to Embodiment 6.

FIG. 7 is a section view schematically illustrating a light source device 2 according to Embodiment 6. A configuration of the light source device 2 according to Embodiment 6 is similar to the configuration according to Embodiment 1 other than the configuration of the light leakage prevention unit. Therefore, the configuration equivalent to Embodiment 1 will be denoted by the same reference numerals and will not be described in detail.

FIG. 7 schematically illustrates an enlarged cross section of an end part of the light source device 2 proximal to the light emitting diode 21 according to Embodiment 6. In Embodiment 6, a first light leakage prevention unit 31f filling a space is provided between the opposing planes of the exposed surface of the light guide plate 22 and the heat dissipation plate 24.

The first light leakage prevention unit 31f according to Embodiment 6 comprises a spacer 34 adhered and secured to the heat dissipation plate 24 along the long side direction thereof and having a concave groove on a surface facing the light guide plate 22, a buffer member 317 fitted and adhered to the concave groove, a shielding sheet 319 adhered to a surface of the buffer member 317 facing the light guide plate 22, and a reflector 316 adhered to the light-source-side surface of the spacer 34. The reflector 316 is similar to that presented in Embodiment 2. The spacer 34 and the buffer member 317 are similar to those presented in Embodiment 3. The light shielding sheet 319 is similar to that presented in Embodiment 5. That is, the first light leakage prevention unit 31f according to Embodiment 6 is configured to utilize the light shielding sheet 319 in place of the reflector 315 of the first light leakage prevention unit 31c according to Embodiment 3.

Inner surface of the rectangular frame of the chassis 27 according to Embodiment 6, a concave groove is formed along the long side direction thereof. Between the opposing planes of the bottom surface of the concave groove and the optical-sheet-26-side edge of one broad surface of the light guide plate 22, a second light leakage prevention unit 32f filling a space is provided.

The second light leakage prevention unit 32f according to Embodiment 6 comprises a buffer member 327 being rectangular in cross section and engaged with the concave groove of the rectangular frame, a light shielding sheet 329 adhered to the light-guide-plate-22-side surface of the buffer member 327, and a reflector 326 adhered to a surface facing the light source of the periphery of the concave groove. The buffer member 327 is similar to that presented in Embodiment 3, and the reflector 326 is similar to that presented in Embodiment 2. Furthermore, the light shielding sheet 329 is similar to that presented in Embodiment 5. That is, the second light leakage prevention unit 32f according to Embodiment 6 is configured to utilize the light shielding sheet 329 in place of the reflector 325 of the second light leakage prevention unit 32c according to Embodiment 3.

According to Embodiment 6, in the first light leakage prevention unit 31f, since the spacer 34 is configured to serve as a reflective body having high reflectivity in the position corresponding to the clearance between the first light leakage prevention unit 31f and the reflection sheet 25 and in the second light leakage prevention unit 32f, there is no need of separately preparing a spacer, which reduces the number of components. In addition, light slightly leaking out from the light-source-side edges of the broad surfaces of the light guide plate 22 out of the light that enters from the side surface of the light guide plate 22 is absorbed by the light shielding sheet 319 and the light shielding sheet 329. This makes it possible to avoid excessive amount of light present at the light-source-side edges of the light guide plate 22 and maintain high display quality in the display apparatus 100 with the light source device 2.

It should be understood that the present embodiment disclosed above is illustrative and not restrictive. The scope is defined by the appended claims rather than by the description preceding them, and all changes that fall within metes and bounds of the claims, or equivalence of such metes and bounds thereof are therefore intended to be embraced by the claims.

The invention claimed is:

1. A light source device comprising:
   a light guide plate having a rectangular shape;
   a substrate having a first surface facing a side surface of the light guide plate;
   a light source arranged on the first surface of the substrate to face the side surface of the light guide plate;
   a reflection sheet having a rectangular shape facing one broad surface of the light guide plate; and
   a plate-shaped member provided at a distance from the one broad surface of the light guide plate to form a room for housing the reflection sheet, wherein
   the plate-shaped member comprises a first part and a second part and is formed in an L-shaped angle, wherein the inner surface of the angle in the first part faces the one broad surface of the light guide plate to be substantially parallel to each other, and the inner surface of the angle in the second part is arranged along the side surface of the light guide plate,
   the substrate is arranged so that a second surface of the substrate which is opposite to the first surface closely contacts with the inner surface of the second part of the plate-shaped member,
   an edge of the reflection sheet proximal to the light source is located inwards of an edge of the light guide plate proximal to the light source, so that an exposed region not covered by the reflection sheet is created near the light source and within the one broad surface of the light guide plate,
   a light leakage prevention unit is provided to fill a space between an exposed region of the one broad surface of the light guide plate and the plate-shaped member, and comprises a protruding portion protruding toward the light source beyond the side surface of the light guide plate, wherein the protruding portion is thinner than other portions within the light leakage prevention unit,
   a clearance is provided between the light leakage prevention unit and the reflection sheet, and
   a reflective body is provided on a surface of the plate-shaped member facing the exposed region of the one broad surface at a position corresponding to the clearance.

2. The light source device according to claim 1, wherein the light leakage prevention unit includes a base body provided with a reflection member on a surface facing the light guide plate and a buffer member on a surface facing the plate-shaped member.

3. The light source device according to claim 2, wherein the base body is configured to be integrated with the reflective body.

4. The light source device according to claim 1, wherein the light leakage prevention unit includes a base body provided with a light shielding member on a surface in contact with the exposed region of the one broad surface of the light guide plate and a buffer member on a surface facing the plate-shaped member.

5. The light source device according to claim 4, wherein the light leakage prevention unit further includes a reflection member provided on a surface of the protruding portion facing the light source.

6. The light source device according to claim 5, wherein the base body is configured to be integrated with the reflective body.

7. The light source device according to claim 4, wherein the base body is configured to be integrated with the reflective body.

8. The light source device according to claim 1, wherein the thickness of the protruding portion of the light leakage prevention unit tapers down toward the first surface of the substrate.

9. The light source device according to claim 1, wherein the light leakage prevention unit has a stepped surface facing the light guide plate.

10. The light source device according to claim 1, wherein the plate-shaped member is a heat dissipation plate.

11. The light source device according to claim 1, further comprising:
    a frame body provided at a distance from an opposite broad surface of the light guide plate which is opposite to the one broad surface of the light guide plate, the frame body is positioned along a peripheral part of the opposite broad surface of the light guide plate; and
    another light leakage prevention unit filling a space between a part of the frame body near the light source and a part of the peripheral part of the light guide plate; wherein
    said another light leakage prevention unit comprises a protruding portion protruding toward the light source beyond the side surface of the light guide plate proximal to the light source, wherein the protruding portion is thinner than other portions within the light leakage prevention unit.

12. The light source device according to claim 11, wherein said another light leakage prevention unit includes a base body provided with a reflection member on a surface facing the light guide plate and a buffer member on a surface facing the frame body.

13. The light source device according to claim 11, wherein said another light leakage prevention unit includes a base body provided with a light shielding member on a surface facing the light guide plate and a buffer member on a surface facing the frame body.

14. The light source device according to claim 13, wherein said another light leakage prevention unit includes a reflection member provided on a surface of the protruding portion facing the light source.

15. The light source device according to claim 11, wherein the thickness of the protruding portion of said another light leakage prevention unit tapers down toward the first surface of the substrate.

16. The light source device according to claim 11, wherein said another light leakage prevention unit has a stepped surface facing the light guide plate.

17. A display apparatus comprising:
    a liquid crystal panel;
    a light guide plate having a rectangular shape arranged in parallel to the liquid crystal panel;
    a substrate having a first surface facing a side surface of the light guide plate;
    a light source arranged on the first surface of the substrate to face the side surface of the light guide plate;
    a reflection sheet having a rectangular shape facing one broad surface side of, opposite to the liquid crystal panel side, of the light guide plate; and
    a plate-shaped member provided at a distance from the one broad surface of the light guide plate to form a room for housing the reflection sheet, wherein
    the plate-shaped member comprises a first part and a second part and is formed in an L-shaped angle, wherein the inner surface of the angle in the first part faces the one broad surface of the light guide plate to be substantially parallel to each other, and the inner surface of the angle in the second part is arranged along the side surface of the light guide plate, the substrate is arranged so that a second surface of the substrate which is opposite to the first surface closely contacts with the inner surface of the second part of the plate-shaped member, an edge of the reflection sheet proximal to the light source is located inwards of an edge of the light guide plate proximal to the light source, so that an exposed region not covered by the reflection sheet is created near the light source and within the one broad surface of the light guide plate, a light leakage prevention unit is provided to fill a space between an exposed region of the one broad surface of the light guide plate and the plate-shaped member, and comprises a protruding portion protruding toward the light source beyond the side surface of the light guide plate, wherein the protruding portion is thinner than other portions within the light leakage prevention unit, a clearance is provided between the light leakage prevention unit and the reflection sheet, and a reflective body is provided on a surface of the plate-shaped member facing the exposed region of the one broad surface at a position corresponding to the clearance.

* * * * *